Feb. 15, 1966  C. V. CORN  3,234,588
SINGLE DRUM PICKING MACHINE
Filed Aug. 15, 1963  4 Sheets-Sheet 1

INVENTOR.
CHARLES V. CORN
BY
Newton, Hopkins + Jones
ATTORNEYS

Feb. 15, 1966  C. V. CORN  3,234,588
SINGLE DRUM PICKING MACHINE
Filed Aug. 15, 1963  4 Sheets-Sheet 2
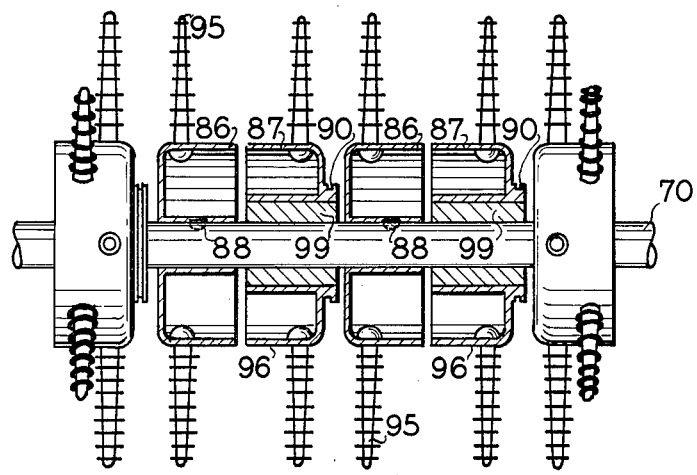
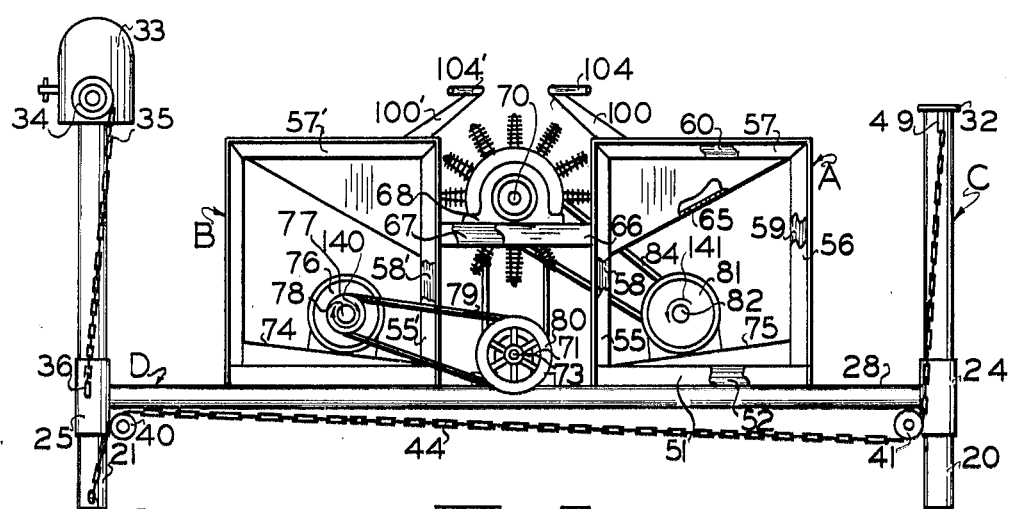
INVENTOR.
CHARLES V. CORN
BY
Newton, Hopkins & Jones
ATTORNEYS Feb. 15, 1966 C. V. CORN 3,234,588
SINGLE DRUM PICKING MACHINE
Filed Aug. 15, 1963 4 Sheets-Sheet 3

INVENTOR.
CHARLES V. CORN
BY
ATTORNEYS

INVENTOR.
CHARLES V. CORN

United States Patent Office 3,234,588
Patented Feb. 15, 1966

3,234,588
SINGLE DRUM PICKING MACHINE
Charles V. Corn, Gainesville, Ga., assignor to Gainesville Machine Co., Inc., Gainesville, Ga., a corporation of Georgia
Filed Aug. 15, 1963, Ser. No. 302,417
4 Claims. (Cl. 17—11.1)

This invention relates to rotary drum type chicken picking machines and more particularly to a picking machine using a single rotary drum to remove the feathers from the neck and shoulders of a chicken or other fowl.

Rotary drum type chicken picking machines are well known in the art. These previous machines customarily employ a plurality of parallel rotary drums, each having a plurality of flexible rubber picking fingers extending from the periphery thereof, to accomplish the removal of feathers from a chicken suspended head down from a shackle carried by a conveyor belt. These previous machines have in most cases effectively removed feathers from most portions of the body of the bird. However, these previous machines have not removed feathers from the neck and shoulders of a chicken in a completely satisfactory manner.

The invention described herein will remove feathers from the neck and shoulders of a chicken in a completely satisfactory manner. This is accomplished without the use of clamping means for holding the head of a chicken and by a machine which takes a minimum of floor space and which is easy and convenient to operate. The machine has a plurality of flexible rubber picking fingers carried by a single drum and rotating in planes of motion distributed in sequence along the line of motion of the bird through the machine.

The flexible rubber picking fingers in adjacent planes of motion are rotating in opposite directions and as the chicken or other fowl passes through the picking machine, its neck and shoulders are alternately engaged by a plurality of flexible rubber picking fingers rotating in one direction and a plurality of flexible rubber picking fingers rotating in the opposite direction. Cooperating with the plurality of flexible rubber picking fingers are two guide bars positioned above the single drum carrying the plurality of flexible rubber picking fingers and on opposite sides of the line of motion of the chicken or other fowl through the picking machine.

These and other features and advantages of the invention will be more clearly understood from the following detailed description and the accompanying drawings in which like characters of reference designate corresponding parts and all figures and in which:

FIG. 2 is an end elevational view of the chicken picking machine showing the two support frames mounted on the vertically adjustable carriage as seen on line 2—2 in FIG. 1.

FIG. 5 is an enlarged fragmentary view, partially in section, of some of the plurality of rotary drum segments mounted on the drum axle.

Figure 1:
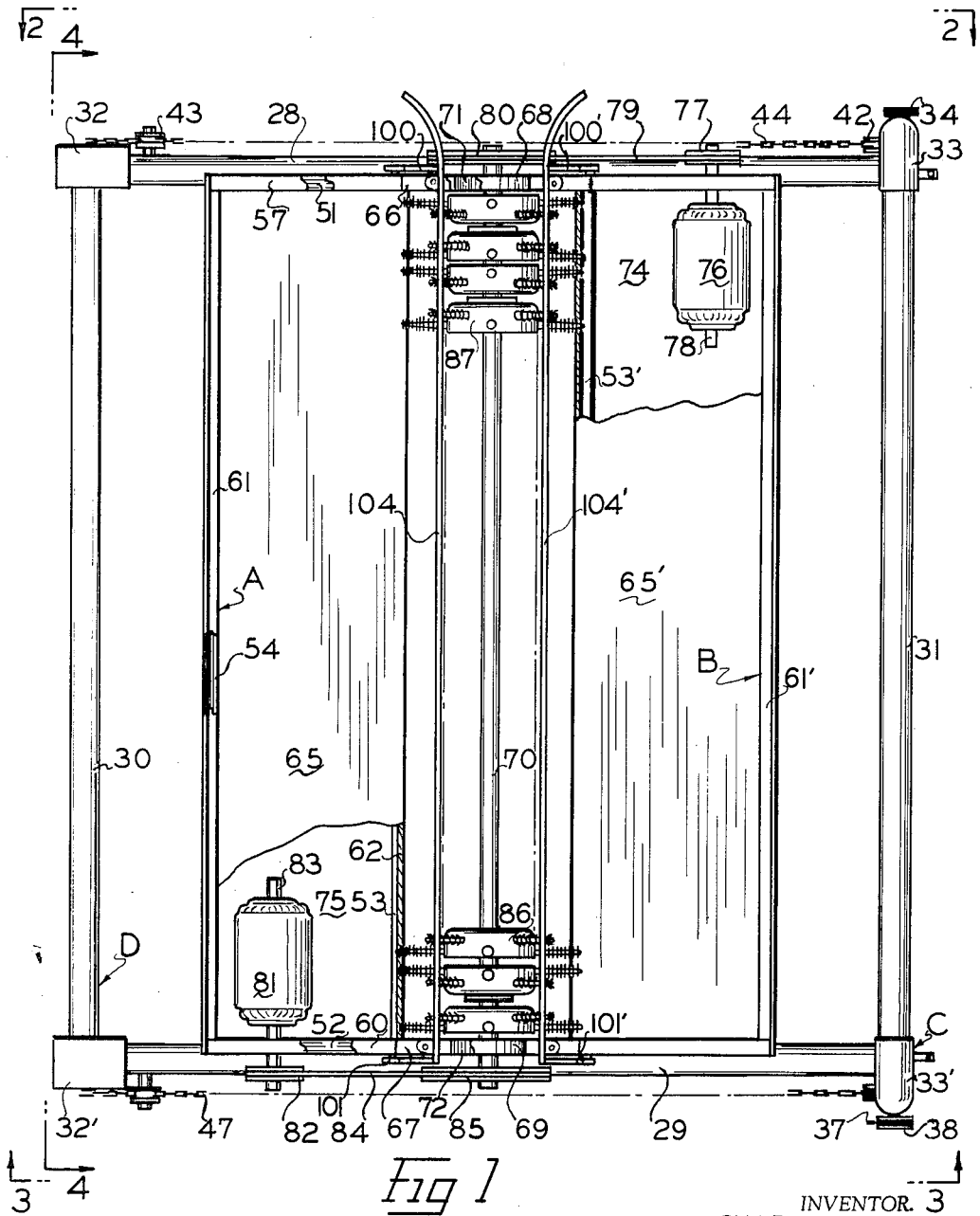
FIG. 1 is a top plan view of the chicken picking machine showing the two support frames extending parallel to each other.
Figure 3:
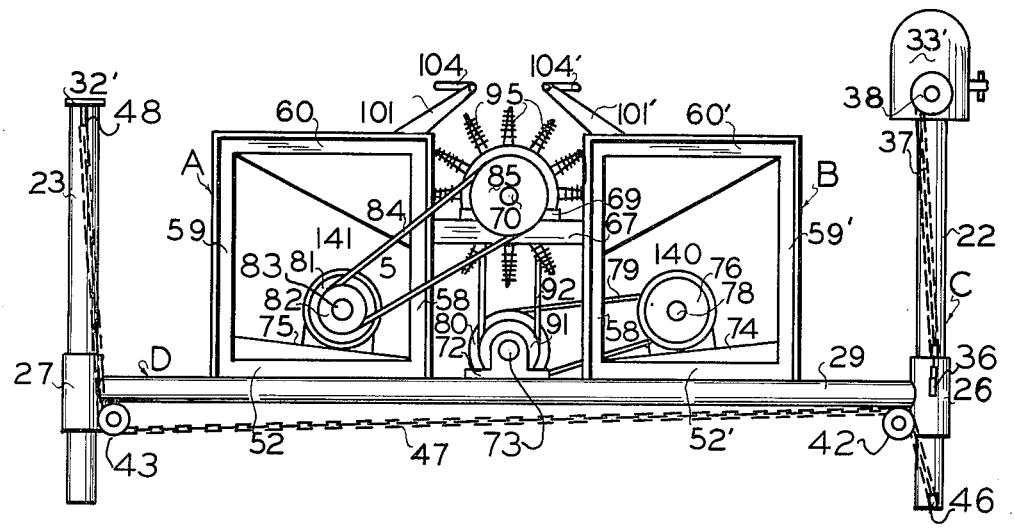
FIG. 3 is an end elevational view of the chicken picking machine as seen on line 3—3 in FIG. 1.
Figure 4:
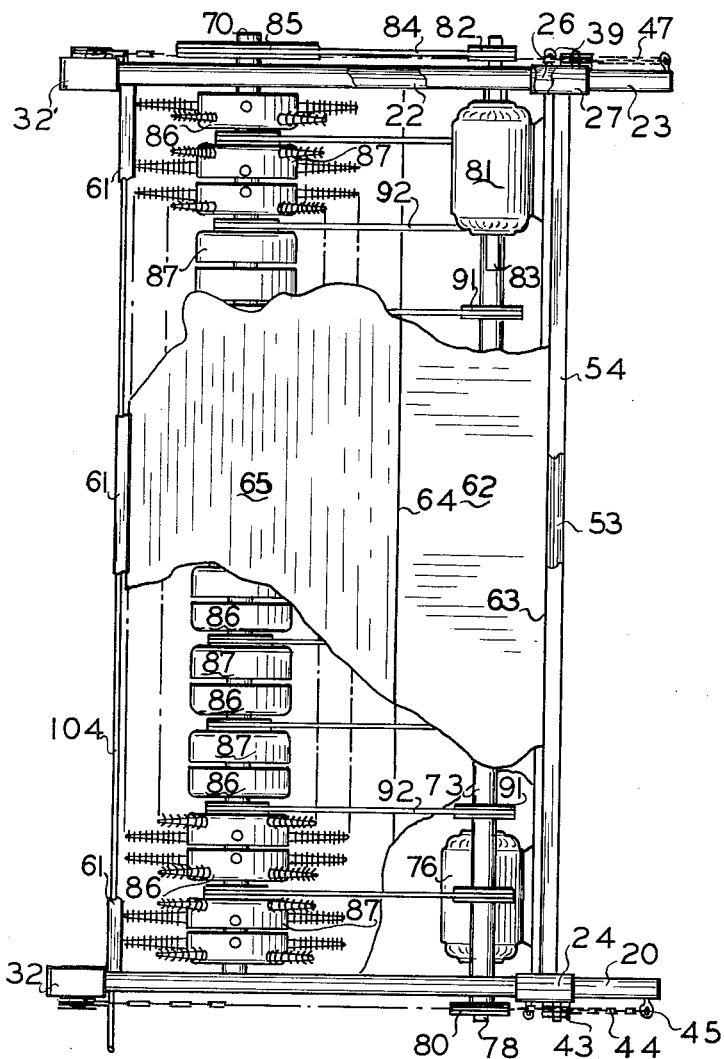
FIG. 4 is a side elevational view, with parts broken away, of the right support frame substantially as it would be viewed on line 4—4 in FIG. 1.

These figures and the following detailed description disclose a preferred specific embodiment of the invention, but invention is not limited to the details disclosed since it may be embodied in other equivalent forms.

This invention is best understood as comprising a right support frame generally indicated by the letter A, a left support frame generally indicated by the letter B and a main frame generally indicated by the letter C. The main frame C supports the right support frame A and the left support frame B and it has vertical posts 20, 21, 22 and 23. A collar 24 is slidably positioned on the post 20, a collar 25 is slidably positioned on the post 21, a collar 26 is slidably positioned on the post 22, and a collar 27 is slidably positioned on the post 23. A first transverse member 28 extends horizontally between the collar 24 and the collar 25 and a second transverse member 29 extends horizontally between the collar 26 and the collar 27. Similarly, a first longitudinal member 30 extends horizontally between the collar 24 and the collar 27 and a second longitudinal member 31 extends horizontally between the collar 25 and the collar 26.

The collars 24, 25, 26 and 27, the longitudinal members 30 and 31, and the transverse members 28 and 29 form a carriage generally indicated by the letter D. The carriage D is vertically adjustable by sliding the collars 24, 25, 26 and 27 along the lengths of the posts 20, 21, 22, and 23. A pad 32 is fixedly attached to the upper end of the post 20 and a pad 32' is fixedly attached to the upper end of the post 23.

A windlass 33 is fixedly attached to the upper end of the post 21 and a windlass 33' is fixedly attached to the upper end of the post 22. The windlass 33 and the windlass 33' are provided with the customary pawl and ratchet arrangement and a chain 35 on the pulley 34 of the windlass 33 is fixedly attached to an eyelet 36 extending from the collar 25. Similarly, a chain 37 on the pulley 38 of the windlass 33' is fixedly attached to an eyelet 39 extending from the collar 26. When the windlass 33 is operated in the customary manner, the collar 25 is raised or lowered along the length of the post 21 and when the windlass 33' is operated in the customary manner, the collar 26 is raised or lowered along the length of the post 22.

A pulley 40 is fixedly mounted on the collar 25, a pulley 41 is fixedly mounted on the collar 24, a pulley 42 is fixedly mounted on the collar 26 and a pulley 43 is fixedly mounted on the collar 27. A first leveling chain 44 extends from an eyelet 45 fixedly positioned at the lower end of the post 21 and over the pulley 40, thence substantially parallel to the first transverse member 28 and under the pulley 41, and thence to a hook 49 extending below the pad 32. A second leveling chain 47 extends from an eyelet 46 fixedly positioned at the lower end of the post 22 and over the pulley 42, thence substantially parallel to the second transverse member 29 and under the pulley 43, and thence to a hook 48 extending below the pad 32'.

The first leveling chain 44 results in the collar 24 being raised and lowered along the length of the post 20 when the collar 25 is raised and lowered along the length of the post 21 by the action of the windless 33. Similarly, the second leveling chain 47 results in the collar 27 being raised and lowered along the length of the post 23 when the collar 26 is raised and lowered along the length of the post 22 by the action of the windlass 33'. Thus, when the windlass 33 is operated, that end of the carriage D supported by the posts 20 and 21 is raised and lowered and when the windlass 33' is operated, that end of the carriage D supported by the posts 20 and 23 is raised or lowered. This carriage D motion resulting from the operation of the windlass 33 and the windlass 33' is used to adjust the vertical position of the support frames A and B carried by the main frame C.

The right support frame A and the left support frame B are parallel to each other and between the first transverse member 28 and the second transverse member 29. The right support frame A and the left support frame B are substantially mirror images of each other and the detailed description to follow will be restricted to the right support frame A. However, the part of the left support frame B corresponding to each part of the right support frame A described is indicated in the drawings by the prime of the reference number used for the right support frame A and the construction of the left support frame B will be readily understood from the description of the right support frame A.

The right support frame A has a lower member 51 at one end and a lower member 52 at its other end. A longitudinal support 53 extends between one end of the lower member 51 and the corresponding end of the lower member 52 and a longitudinal support 54 extends between the other end of the lower member 51 and the corresponding end of the lower member 52. It is the lower member 51 that is fixedly attached to the transverse member 28 by welding or other known means and it is the lower member 52 that is fixedly attached by welding or other known means to the transverse member 29. The lower members 51 and 52 and the longitudinal supports 53 and 54 form a rectangular base which is vertically movable with the transverse members 28 and 29.

Extending vertically from the intersection of the lower member 51 and the longitudinal support 53 is a vertical member 55 and extending vertically from the other end of the lower member 51 is a second vertical member 56. An upper member 57 extends between the extending end of the vertical member 55 and the extending end of the vertical member 56 parallel to the lower member 51. This upper member 57, the lower member 51, the vertical member 55 and the vertical member 56 form a rectangular frame generally perpendicular to the rectangular frame formed by the longitudinal support 53, the longitudinal support 54, the lower member 51 and the lower member 52.

Extending vertically from the intersection of the lower member 52 and the longitudinal support 53 is a vertical member 58 and extending vertically from the other end of the lower member 52 is a vertical member 59. An upper member 60 extends between the extending end of the vertical member 58 and the extending end of the vertical member 59 parallel to the lower member 52. This upper member 60, the vertical member 58, the vertical member 59, and the lower member 52 form a rectangular frame parallel to the rectangular frame formed by the upper member 57, the vertical member 55, the vertical member 56, and the lower member 51.

Extending parallel to the longitudinal support 54 between the vertical members 56 and 59 is a spacer member 61. A lower plate 62 extends between the vertical member 55 and the vertical member 58 with the lower edge 63 of the lower plate 62 joined by welding or other known means to the longitudinal support 53 and with the upper edge 64 of the lower plate 62 parallel to the longitudinal support 53. The height of the lower plate 62 between its lower edge 63 and upper edge 64 is less than the height of the vertical members 55 and 58 and an upper plate 65 extends between the spacer member 61 and the upper edge 64 of the lower plate 62. The height of the spacer member 61 above the longitudinal support 54 is greater than the height of the upper edge 64 of the lower plate 62 above the longitudinal support 53. As a result, the upper plate 65 slopes downward from the spacer member 61 to the upper edge of 64 of the lower plate 62. The lower plate 62 and the upper plate 65 form a continuous shield which slopes downward from the spacer member 61 to the vertical members 55 and 58 and then continues downward between the vertical members 55 and 58 to the longitudinal support 53.

A first connector member 66 extends parallel to the transverse member 28 between the vertical member 55 of the right support frame A and the vertical member 55' of the left support frame B. Similarly, a second connector member 67 extends parallel to the transverse member 29 between the vertical member 58 of the right support frame A and the vertical member 58' of the left support frame B. The connector members 66 and 67 lie in a plane of reference which is parallel to a plane of reference containing the transverse members 28 and 29 and which is parallel to and above a plane of reference containing the upper edges 64 and 64' of the lower plates 62 and 62'.

A first drum axle mounting 68 is fixedly attached to the first connector member 66 between the vertical members 55 and 55' and a second drum axle mounting 69 is fixedly attached to the second connector member 67 between the vertical members 58 and 58'. A drum axle 70 extends between and rotatably through the drum axle mountings 68 and 69. Similarly, a first drive axle mounting 71 is fixedly mounted on the transverse member 28 between the vertical members 55 and 55' and a second drive axle mounting 72 is fixedly mounted on the transverse member 29 between the vertical members 58 and 58'. A drive axle 73 extends between and rotatably through the first drive axle mounting 71 and the second drive axle mounting 72.

The drum axle mountings 68 and 69 and the drive axle mountings 71 and 72 are positioned so that a reference plane containing the centerline of the drum axle 70 and the centerline of the drive axle 73 is parallel to and equidistant from the vertical members 55, 55' and 58 and 58'. In addition, the drum axle mountings 68 and 69 and the drive axle mountings 71 and 72 are positioned so that the centerline of the drum axle 70 is parallel to the centerline of the drive axle 73.

Extending between and fixedly attached to the longitudinal supports 53 and 54 adjacent to the lower member 52 is a first motor mounting plate 75. Similarly, extending between and fixedly attached to the longitudinal supports 53' and 54' adjacent to the lower member 51' is a second motor mounting plate 74. Both mounting plates extend fully across the bottom of each support frame.

Fixedly mounted on the second motor mounting plate 74 is a drive axle motor 76. The motor 76 is of known conventional type having a pulley 77 fixedly mounted at one end of its drive shaft 78. The pulley 77 of the motor 76 is connected by a belt 79 to a pulley 80 fixedly mounted at that end of the drive axle 73 extending beyond the first drive axle mounting 71. Operation of the motor 76 in the usual and known manner causes rotation of the pulley 80 and of the drive axle 73.

Fixedly mounted on the first motor mounting plate 75 is a drum axle motor 81. The drum axle motor 81 is of known conventional type having a pulley 82 fixedly mounted at one end of its drive shaft 83. The pulley 82 is connected by a belt 84 to a pulley 85 fixedly mounted on that end of the drum axle 70 extending beyond the second drum axle mounting 69. Operation of the drum axle motor 81 in the usual and known manner causes rotation of the pulley 85 and of the drum axle 70. With rotation of the motors 76 and 81 in opposite rotational directions as indicated by the arrows 140 and 141 in FIG. 2, this arrangement of the motors 76 and 81 and of the pulleys 77, 80, 82 and 85 causes the drum axle 70 and drive axle 73 to rotate in opposite directions.

Distributed along the length of the drum axle 70 are a plurality of directly driven rotary drum segments 86 and alternately spaced with the directly driven drum segments 86 along the length of the drum axle 70 are a plurality of remotely driven rotary drum segments 87. Each of the directly driven drum segments 86 is concentric with the centerline of the drum axle 70 and each is locked to the drum axle 70 in known manner by a key 88 so as to insure that each of the plurality of directly driven drum segments 86 rotates with the drum axle 70.

Each of the plurality of remotely driven drum segments 87 is also concentric with the centerline of the drum axle 70. However, each of the plurality of remotely driven drum segments 87 has a sleeve bearing 99 and is freely rotatable about the drum axle 70. Each remotely driven drum segment 87 has a drum pulley 90 integral with it and a plurality of drive pulleys 91 are distributed along the length of the drive axle 73.

Each of the plurality of drum pulleys 90 is joined by one of a plurality of belts 92 to one of the plurality of drive pulleys 91. The drive pulleys 91 are fixedly mounted on the drive axle 73 and rotation of the drive axle 73 causes rotation of the drive pulleys 91 and of the plurality of remotely driven drum segments 87.

As a result of the foregoing arrangement for rotating the plurality of directly driven drum-segments 86 and the plurality of remotely driven drum-segments 87, the directly driven drum segments 86 are driven in one rotational direction and the remotely driven drum segments 87 are driven in the opposite rotational direction. The drum segments 86 and 87 are substantially identical and have one side open to facilitate the insertion of flexible rubber picking fingers of known type into their peripheral surfaces 96.

The flexible rubber picking fingers 95 extend from the peripheral surfaces 96 of both the plurality of directly driven drum segments 86 and the plurality of remotely driven drum segments 87 in a radial manner and in the specific embodiment of the invention shown in the figures, each of the drum segments 86 and 87 carries twelve flexible rubber picking fingers 95. The twelve flexible rubber picking fingers 95 are distributed about the peripheral surface 96 of each of the plurality of rotary drum segments 86 and 87 by equally distributing six flexible rubber picking fingers 95 along each of two laterally displaced circumferential paths on each peripheral surface 96. The six flexible rubber picking fingers 95 distributed along one circumferential path are angularly displaced from the six flexible rubber picking fingers 95 distributed along the second circumferential path by an amount sufficient to make the angular distance between each of the twelve flexible rubber picking fingers 95 equal.

A first guide bar support 100 extends upward from the upper member 57 and over the space between the support frames A and B and a second guide bar support 101 extends upward from the upper member 60 and over the space between the support frames A and B. Similarly, guide bar supports 100' and 101' extend from the upper members 57' and 60' over the space between the support frames A and B. A right guide bar 104 is carried by the extending ends of the guide bar supports 100 and 101 and a left guide bar 104' is carried by the extending ends of the guide bar supports 100' and 101'.

The centerline of the right guide bar 104 is in a vertical plane of reference between the vertical members 55 and 58 and the centerline of the drum axle 70 and the centerline of the left guide bar 104' is in a vertical plane of reference between the vertical members 55' and 58' and the centerline of the drum axle 70. The guide bars 104 and 104' curve away from each other as they extend beyond the transverse member 28 and they both lie in a plane of reference parallel to the longitudinal supports 53 and 53' and above the plurality of flexible rubber picking fingers 95. The flexible rubber picking fingers 95 are of known type customarily used with rotary drum type picking machines and for this reason they have not been described in detail.

*Operation*

The motor 76 is driven in a clockwise direction and the motor 81 is driven in a counterclockwise direction as viewed in FIG. 2. The operation of the motor 76 in this manner rotates the drive axle 73 in a clockwise direction and this in turn, rotates the pulleys 91 and the remotely driven drum segments 87 in a clockwise direction. The operation of the motor 81 in a counterclockwise direction turns the drum axle 70 and the directly driven drum segments 86 in a counterclockwise direction.

The result is that alternate drum segments 86 and 87 are rotated in opposite directions and it is this opposite rotation of the drum segments 86 and 87 rather than the particular rotational direction of the drum segments 86 and 87 that effectively picks the feathers from the neck and shoulders of a fowl. The picking action of the picking fingers 95 carried by the drum segments 86 and 87 is equally effective if the remotely driven drum segments 87 are rotated in a counterclockwise direction and the directly driven drum segments 86 are rotated in a clockwise direction.

A chicken or other fowl carried head lowermost by a conveyor belt (not shown) between the guide bars 104 and 104' will be alternately driven toward the right guide bar 104 and the left guide bar 104' by the alternately rotating picking fingers 95. When the chicken is forced against the right guide bar 104 or the left guide bar 104' feathers are removed from that portion of the chicken's neck and shoulders engaged by those picking fingers 95 forcing it against the guide bar 104 or 104'. The shifting of the chicken between guide bars 104 and 104' by the oppositely rotating fingers 95 causes the chicken to spin and all portions of its neck and shoulders to be engaged by the picking fingers 95. The curving away of the guide bars 104 and 104' from each other as they extend beyond the transverse member 28 serves to guide a chicken or other fowl into position between the support frames A and B.

It will be obvious that many variations may be made in the embodiment here chosen for the purpose of illustrating the present invention without departing from the scope thereof as defined by the appended claims.

What is claimed as invention is:

1. In a poultry picking machine, a pair of support frames positioned parallel to each other; a single drum axle rotatably positioned between said support frames; a drive axle rotatably positioned between said support frames below the drum axle; a first series of drum segments fixedly positioned on the drum axle; a second series of drum segments rotatably positioned on the said drum axle with the drum segments of the said second series interspersed alternately among the drum segments of the said first series of drum segments; a series of pulleys fixedly positioned on the drive axle; means operatively connecting the said series of pulleys to the second series of drum segments for rotation in the same direction; means mounted on the said support frames for rotating the drum axle in one rotational direction and the drive axle in a rotational direction opposite to the rotational direction of the drum axle; a pair of guide bars mounted on the support frames and extending parallel to each other to form a channel parallel to and directly above the drum axle; and resilient picking fingers rotatably carried by the drum segments of the first and second series of drum segments for picking feathers from poultry passed through the channel formed by the guide bars.

2. A poultry picking machine including a plurality of drum segments rotatably mounted along a substantially horizontal axis, drive means operatively connected to certain of said drum segments for causing clockwise rotation and with remainder of said drum segments for causing counter-clockwise rotation, at least two adjacent drum segments rotating in opposite directions, resilient means mounted on said drum segments for striking and picking feathers from poultry, and, means for guiding poultry in a predetermined path above and in axial alignment with said drum segments.

3. A poultry picking machine including a frame, a drum axle supported by said frame along a substantially horizontal axis, a first series of drum segments mounted on said drum axle, a second series of drum segments mounted on said drum axle interposed between said first series of drum segments, independent means for rotating said first and second series of drum segments in opposite directions, resilient picking fingers carried by said drum segments for picking feathers from poultry, and means for guiding poultry in a predetermined path above and in axial alignment with said drum segments.

4. A poultry picking machine including a frame, a drum axle supported by said frame along a substantially horizontal axis, a first series of drum segments mounted on said drum axle, a second series of drum segments mounted on said drum axle interposed between said first series of drum segments, means for rotating said first and second series of drum segments in opposite directions, resilient picking fingers carried by said drum segments for picking feathers from poultry, and means for guiding poultry in a predetermined path above and in axial alignment with said drum segments.

References Cited by the Examiner

UNITED STATES PATENTS

| 2,743,477 | 5/1956 | Barker et al. | 17—11.1 |
| 2,782,457 | 2/1957 | Lentz et al. | 17—11.1 X |
| 3,044,108 | 7/1962 | DeLong | 17—11.1 |

SAMUEL KOREN, *Primary Examiner.*

LUCIUS H. LAUDENSLAGER, *Examiner.*